United States Patent [19]
Moody

[11] Patent Number: 5,419,800
[45] Date of Patent: May 30, 1995

[54] SPLIT GASKET ATTACHMENT STRIP

[75] Inventor: Paul E. Moody, Barrington, R.I.

[73] Assignee: The United States of America as represented by the Secretary of the Navy, Washington, D.C.

[21] Appl. No.: 187,025

[22] Filed: Jan. 27, 1994

[51] Int. Cl.⁶ ............................................. B65H 69/02
[52] U.S. Cl. .................. 156/502; 156/304.5; 156/510; 156/513; 83/167; 83/743
[58] Field of Search ............... 156/502, 503, 510, 513, 156/304.5; 83/167, 198, 743

[56] References Cited

U.S. PATENT DOCUMENTS 3,392,077  7/1968  Brieske et al. .................. 156/513 X
4,299,027  11/1981 Yoshieda et al. ............... 156/513 X

FOREIGN PATENT DOCUMENTS 8704391  7/1987  WIPO .................................. 156/513

Primary Examiner—David A. Simmons
Assistant Examiner—Paul M. Rivard
Attorney, Agent, or Firm—Michael J. McGowan; Prithvi C. Lall; James M. Kasischke

[57] ABSTRACT

The present invention relates to a method and hardware for bonding together ends of a sealing strip. The method of the present invention comprises the steps of cutting a slot in both a first end and a second end of a sealing strip, inserting an attachment strip having a plurality of engaging members into the slot cut into the first end, applying adhesive to the second end of the sealing strip, and placing the two ends of the sealing strip into an abutting relationship by inserting the attachment strip into the slot in the second end and sliding the ends together. The hardware used to effect the method includes an alignment guide having a substantially C-shaped channel for receiving the ends of the sealing strip to be joined together. The alignment guide has an end cap associated therewith having one or more slots for receiving a cutting tool for cutting slots in the ends of the sealing strip. The hardware further includes an attachment strip which is used to join the ends of the sealing strip together.

9 Claims, 2 Drawing Sheets

SPLIT GASKET ATTACHMENT STRIP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a method for bonding together ends of a sealing strip such as the ends of a split gasket and an apparatus for carrying out the method.

(2) Description of the Prior Art

Sealing strips have been used in a variety of different applications to keep solid materials such as dust and liquid materials such as water from entering a particular environment. For example, sealing strips have been used on windows, doors, covers, and the like for maintaining a tight joint between two edges or faces which can be parted in the plane of, or at right angles to the joint. These sealing strips have taken a variety of different shapes and configurations.

U.S. Pat. No. 3,029,481 to Henniges illustrates one such sealing strip formed from an elastic compound. This sealing strip has utility in a number of different applications, some of which require the sealing strip to maintain a certain rigidity. In order to enable the sealing strip to exhibit the necessary rigidity, Henniges' sealing strip is provided with a slot for receiving a metal strip.

U.S. Pat. No. 4,064,924 to Catlett illustrates a generally U-shaped sealing strip applied to edges of a panel located along the center line of a doorway. The sealing strip includes a flexible web or hinge section and a pair of substantially rigid arms that extend outwardly from the end section. The inner surface of each arm is provided with a series of teeth which engage opposite faces of the panel on which the sealing strip is mounted. The teeth are locked in engagement with the faces of the panel by a locking unit which includes a female locking element and a cooperating male element both of which have cooperating ratchet type teeth. Engagement of the ratchet teeth prevents the arms from being spread apart and thereby maintains tight engagement of the sealing strip to the edge of the panel.

A similarly constructed edge seal for an exterior door such as a storm door is illustrated in U.S. Pat. No. 5,168,669 to Knapp. As shown therein, an adjustable lower edge seal assembly for an exterior door comprises an elongated sealing strip member having a seal carrying base and a transverse edge attachment flange which is secured to an outer face of a door adjacent the lower edge thereof. A flexible seal projects outwardly of the base. The flange is provided with holes to receive fasteners to secure it to the lower edge wall of the door. The base is also provided with an adjustable connector to receive a connecting flange of a stabilizing connector strip member therein. The stabilizing connector strip member has an abutment wall to abut an opposed face of the door adjacent an opposed lower edge of the door. The stabilizing connector strip also has a transverse rear retention wall defining teeth of saw-tooth cross-section. The teeth engage similarly constructed teeth in a connector portion of the seal assembly.

U.S. Pat. No. 5,054,240 to Nakahara et al. illustrates a weather strip used in vehicles. The weather strip has an end member for sealing an open end thereof. The end member includes a fastening portion for elastically holding a portion of the edge of the vehicle which is covered by the weatherstrip to retain the end member to the open end of the weatherstrip and a sealing portion for blocking the open end of the weatherstrip. The various embodiments of the end member include a number of different male and female connections for joining the end member to the weatherstrip.

Sealing strips taking the form of gaskets are used in a number of application. One such use is in submarine torpedo tubes. Currently, existing submarine torpedo tube slide valve gaskets are made in one piece. When they start to leak, a considerable amount of effort is required to replace them. Efforts have been made to determine the feasibility of utilizing a strip of gasket material which is bonded end to end to simplify the gasket replacement procedure. In addition to simplifying the existing gasket replacement procedure, the use of a strip of gasket material would permit the development of different slide valve designs which up to now have been rejected due to the gasket replacement problem.

Some of the efforts in identifying the feasibility of a gasket approach have included an investigation into particular types of bonding adhesives which can be used to join the two ends of a gasket strip together. These investigations have shown that suitable bonding adhesives exist; however, two problems still must be resolved. The first problem is the difficulty involved in properly aligning the two ends of the gasket during the bonding operation. The second problem is the fact that the bonding adhesive does not have a life expectancy which is as long as the basic gasket material. Once the adhesive fails, the gasket ends may separate from one another and open up a path for leakage. Consequently, there still remains a need for a technique for securely fastening two ends of a split gasket material together.

SUMMARY OF THE INVENTION

Accordingly, it is an object of the present invention to provide a method for bonding together ends of a sealing strip and for substantially avoiding separation of the ends should a bonding adhesive fail.

It is a further object of the present invention to provide a method wherein two ends of a sealing strip such as a gasket can be joined together with near perfect alignment.

It is still another object of the present invention to provide a method as above which is relatively simple to use.

It is yet a further object of the present to provide the tools necessary to carry out the foregoing method.

The foregoing objects are attained by the method and the kit of the present invention.

In accordance with the present invention, a method for bonding together opposed ends of a sealing strip is described. The method comprises the steps of: cutting a slot in both a first end and a second end of the sealing strip; inserting an attachment strip having a plurality of engaging members into the slot cut into the first end; applying adhesive to the second end of the sealing strip; and placing the two ends of the sealing strip into an abutting relationship by inserting the attachment strip into the slot in the second end and sliding the ends together. The method further comprises holding the ends together until the adhesive has cured sufficiently to effect the bond.

To facilitate the performance of the method of the present invention, several pieces of hardware have been especially designed. The first piece of hardware is an alignment guide having a channel for receiving the ends of the sealing strip to be joined together. The alignment guide is provided with an end cap having a slot at a desired height above a surface of the channel in the alignment guide. The slot is used to locate the slot which is to be cut into each end of the sealing strip material. The hardware further includes a tool which can be passed through the slot and into the end of the sealing strip material for cutting a slot having a desired width and depth into the end of the sealing strip. The hardware further includes an attachment strip to be inserted into both ends of the sealing strip for facilitating the joining of the two ends. In a preferred embodiment of the present invention, the attachment strip is formed from a plastic material and has two sets of oppositely directed contacting members. The contact members have a span which is slightly wider than the width of the slot in each end of the sealing strip. As a consequence, the contact members engage sidewall portions of the sealing strip material defining the slot and lock themselves into place.

Further details of the method and the hardware forming the apparatus of the present invention are described in the following description and the accompanying drawings wherein like reference numerals depict like elements.

DETAILED DESCRIPTION OF THE PREFERRED EMBODIMENT(s)

Figure 1:
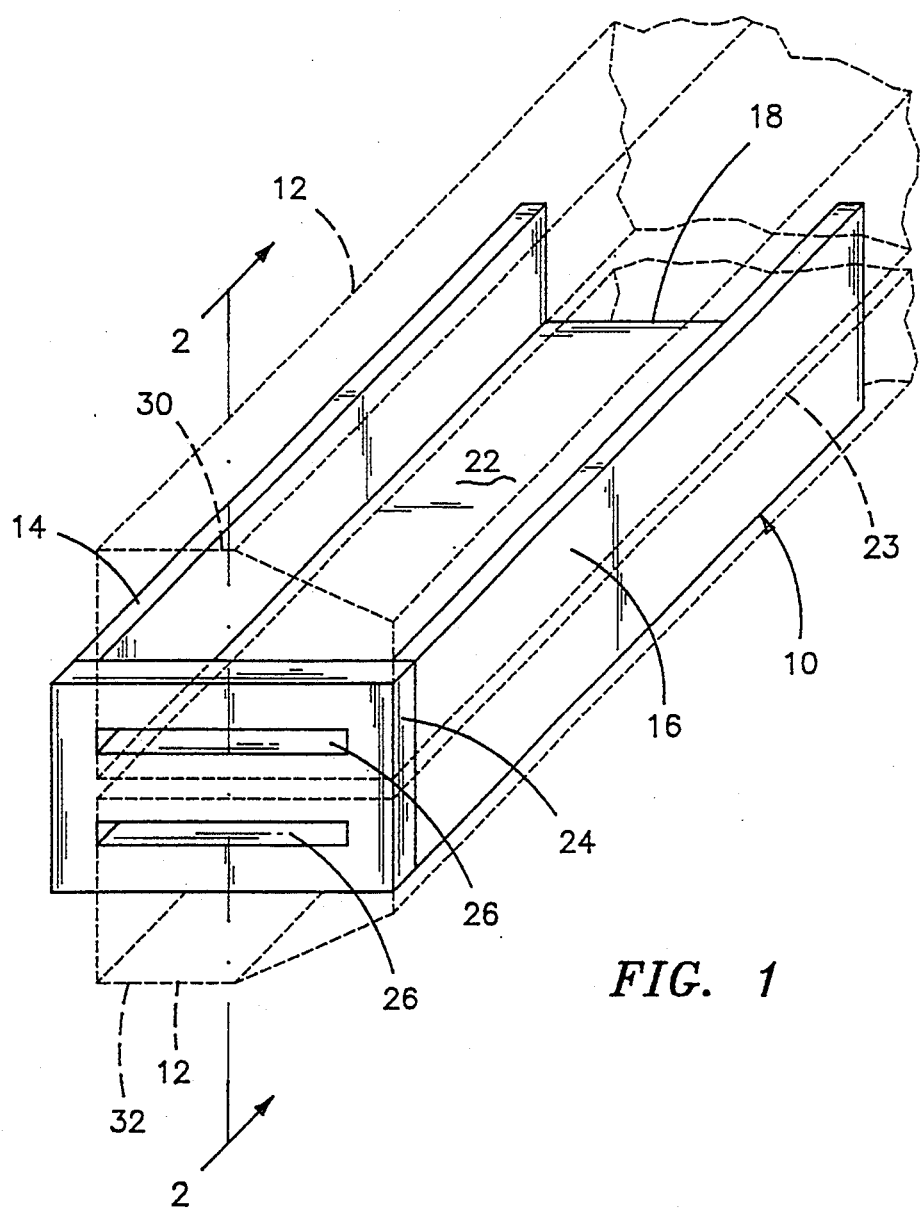
FIG. 1 is a perspective view of an alignment guide used to join the two ends of the gasket material together.
Figure 2:
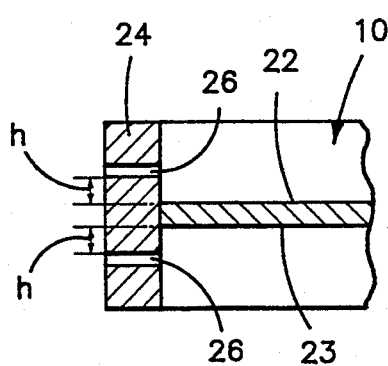
FIG. 2 is a sectional view of the alignment guide of FIG. 1 taken along plane 2—2.

Referring now to the drawings, FIG. 1 illustrates an alignment guide 10 which is used to cut slots in the ends of a sealing strip 12 (shown with broken lines in FIG. 1) and to align the ends of sealing strip 12 together during the joining or bonding process. As shown in FIG. 2, alignment guide 10 has a substantially I-shaped cross section. This I-shaped cross-section is defined by two side rails 14 and 16 and a connecting member 18. Side rails 14 and 16 and connecting member 18 define two substantially C-shaped side channels 20. This allows two opposed ends of a split sealing strip 12 to be simultaneously inserted in the side channels 20 of the I-shaped guide 10 so that a cut can be formed in each end at the same time. Preferably, side rails 14 and 16 are spaced apart a distance substantially equal to the width of sealing strip 12.

Alignment guide 10 can be formed from any suitable material known in the art. For example, it can be formed from a metal such as aluminum, aluminum alloy, iron, or an iron alloy. Alternatively, alignment guide 10 can be formed from a plastic material.

Connecting member 18 has surfaces 22 and 23 on which sealing strip 12 can be positioned. For reasons which will become clearer in the ensuing text, it is desirable to either coat surfaces 22 and 23 with a non-stick material, such as Teflon or the like, or to lightly oil it.

Alignment guide 10 includes an end cap 24. End cap 24, as shown in FIGS. 1 and 2, has two symmetrical guide slots 26 cut therein. Each guide slot 26 is positioned at a preset height h above the surface 22 or below the surface 23. Each guide slot 26 is aligned with a respective channel 20 of I-shaped alignment guide 10. As will be described hereinafter, these guide slots 26 are utilized to cut slots in each end of the sealing strip 12. End cap 24 can be joined to the alignment guide 10 in any suitable manner. For example, end cap 24 can be glued or welded to alignment guide 10.

As shown in FIG. 2, the guide slot 26 in the end cap is positioned at a desired height h above the surface 22 or below the surface 23. This allows attachment slots 28 and 28' to be cut into the gasket material at a desired height.

A tool (not shown), such as a knife blade, can be inserted through the guide slots 26 in end cap 24 into ends 30, 32 of the sealing strip 12 to create an attachment slot 28, 28' in an end of the sealing strip 12 having a desired width w and depth d.

To create slots 28 and 28' in ends 30 and 32 of sealing strips 12, a first end 30 of sealing strip 12 is inserted in alignment guide channel 20 such that end 30 abuts end cap 24. A second end 32 of sealing strip 12 is inserted in channel 20 on the other side of alignment guide 10 abutting end cap 24. A cutting tool is inserted through first end cap slot 26 to create slot 28 in first end 30 of sealing strip 12. After first slot 28 has been cut, the cutting tool is withdrawn and inserted in second end cap slot 26 to cut slot 28' in second end 32 of sealing strip.

Figure 3:
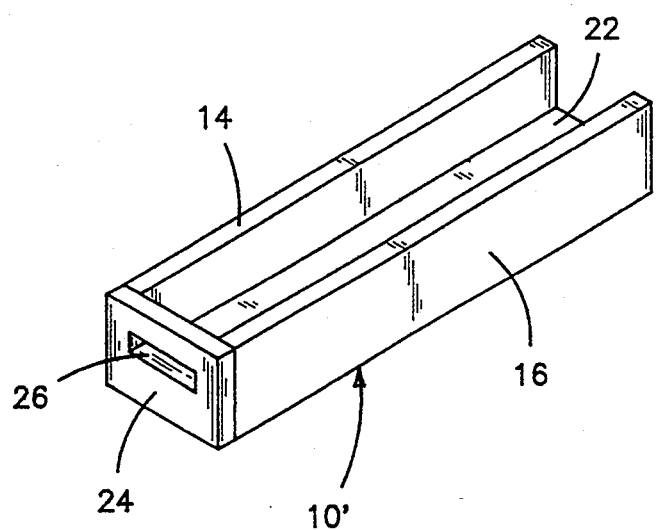
FIG. 3 is a perspective view of an alternative embodiment of an alignment guide which can be used to perform the method of the present invention.

In an alternate embodiment of this invention, shown in FIG. 3, alignment guide 10 has a C shaped cross section and end cap 24 has only one slot 26 therein. This embodiment does not permit both slots 28 and 28' to be made without rearrangement of sealing strip 12. Accordingly, first end 30 of sealing strip 12 is inserted in alignment guide channel 20 such that end 30 abuts end cap 24. A cutting tool is inserted through end cap slot 26 to create slot 28 in first end 30 of sealing strip 12. The cutting tool is removed, and sealing strip 12 is reoriented with second end 32 of sealing strip 12 inserted in alignment guide channel 20 abutting end cap 24. The cutting tool is inserted through end cap slot 26 to cut a slot 28' in second end 32. The alternate embodiment of alignment guide 10 only affects the method of cutting slots 28 and 28'. In all other respects the practice of the invention is the same.

Figure 4:
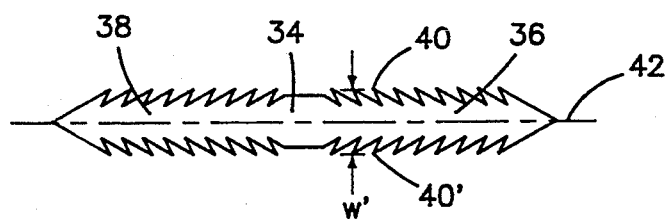
FIG. 4 is a plan view of an attachment strip in accordance with the present invention.

As shown in FIG. 4, an attachment strip 34 is provided having a first set of contact members 36 angled in a first direction and a second set of contact members 38 angled in a second direction opposed to the first direction. As shown therein, each set of contact members 36, 38 has barbed portions 40 on both sides of the longitudinal axis 42 of the attachment strip 34. Preferably, each set of contact members 36, 38 has a span w' which is greater than the width w of slots 28, 28'. As used herein, the term "span" means the distance from one barb 40 on one side of longitudinal axis 42 to a second barb 40' on the opposite side of longitudinal axis 42 in a plane substantially perpendicular to longitudinal axis 42. While attachment strip 34 can be formed from any material known in the art, it is preferred that it be formed from a plastic material.

By providing each set of contact members 36 and 38 with a span w' greater than the width w of slots 28, 28', barbs 40 are allowed to dig into the sealing strip material forming the sidewalls of the slot 28 or 28'. As a consequence, the attachment strip 34 is securely held in position.

Figure 6:
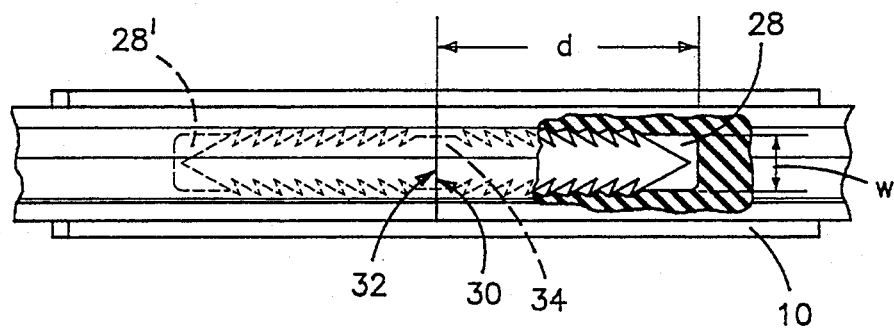
FIG. 6 is a top view of the alignment guide with two ends of a sealing strip positioned in abutting relationship and further illustrating a partial sectional view of an end of the sealing strip.
Figure 5:
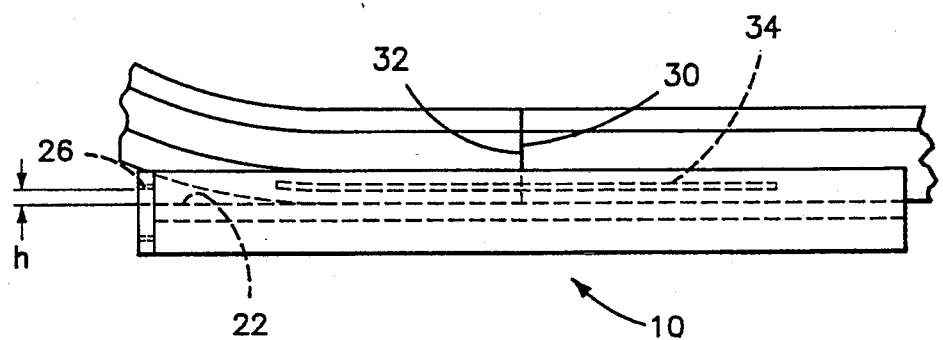
FIG. 5 is a side view of the alignment guide of FIG. 1 with two ends of a sealing strip positioned therein.

Referring now to FIGS. 5 and 6, there is shown alignment guide 10 with sealing strip 12 positioned therein. After two slots 28, 28' have been cut in the opposite ends of sealing strip 12, the portion of sealing strip 12 having the first end 30 is repositioned within alignment guide channel 20. Thereafter, the attachment strip 34 is inserted into the slot 28. Attachment strip is preferably inserted up to its midpoint.

After attachment strip 34 has been inserted into slot 28, an adhesive material is applied to second end 32. Any adhesive material such as an anaerobic cyanoacrylate adhesive or the like can be applied to the sealing strip end 32. Thereafter, second end 32 of sealing strip 12 is inserted into alignment guide 10 in a manner which allows the remaining portion of the attachment strip 34 to enter the slot 28'. Ends 30 and 32 are then manually brought together into an abutting relationship. Ends 30 and 32 are manually held together, typically for a time period of from 10 to 15 seconds, to effect the complete bonding of ends 30 and 32. As previously mentioned, surface 22 of the alignment guide 10 is either preferably Teflon-coated or lightly oiled. This is done to prevent any leaking adhesive material from bonding sealing strip 12 to alignment guide 10.

The use of alignment guide 10 in conjunction with the attachment strip 34 substantially avoids the problem of improper alignment of sealing strip ends 30 and 32 during the bonding operation. The use of the attachment strip 34 also insures that the two ends 30 and 32 of the sealing strip 12 do not back away from each other even if the adhesive fails. Because the width of the adhesive material is minimal, fluid leakage at the joint resulting from deterioration of the adhesive is also minimal.

As can be seen from the foregoing discussion a method has been provided which allows two ends of a sealing strip or gasket material to be joined together with near perfect alignment. It can also be seen that the method of the present invention is relatively simple to perform.

While a particular configuration has been shown for the alignment guide and the attachment strip, it should be recognized that the size and shape of these hardware pieces can be modified to suit any gasket design and size. For example, the drawings reflect the orientation of an attachment strip which would be appropriate for slide valve gaskets which bend around an axis which is parallel to the flat side of the gasket. If the gasket axis was 90° from this position such as in a muzzle or breech door, then the orientation of the attachment strip would have to be rotated 90°. The basic rule associated with the use of the attachment strip 34 is that it should always be oriented so that it bends around its narrowest cross-section.

It is apparent that there has been provided in accordance with this invention a split gasket attachment strip which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A kit for bonding two ends of a sealing strip together which comprises:
   - an alignment guide having channel means for engaging at least one of the ends of the sealing strip to be joined together and an end cap with at least one slot therein aligned with said channel means, said at least one slot facilitating the cutting of a slot in each of said ends;
   - a cutting tool adapted for insertion into said at least one end cap slot to cut slots in said ends; and
   - an attachment strip means for attaching the ends of the sealing strip together, wherein said attachment strip means is inserted into said cut slots in said ends of said sealing strip to hold said ends together.

2. The kit of claim 1, wherein said channel means has a surface coated with a non-stick material.

3. The kit of claim 1 wherein said channel means has a lightly oiled surface.

4. The kit of claim 1 wherein said attachment strip means has a first set of contacting members angled in a first direction and a second set of contacting members angled in a second direction opposed to said first direction.

5. The kit of claim 4 wherein said attachment strip means is formed from a plastic material.

6. The kit of claim 4 wherein said attachment strip means has a longitudinal axis and each set of contacting members has members on opposite sides of said longitudinal axis.

7. A kit for bonding two ends of a sealing strip together which comprises:
   - an alignment guide having two parallel channel means each for engaging separate ends of the sealing strip, wherein the channel means are separated by a barrier wall and each of the channel means is terminated by an end cad having a slot therein leading into the channel, wherein each of said slots is for facilitating the cutting of slots in the ends of the sealing strip;
   - a cutting tool adapted to be inserted into each of the slots of each end cap for cutting slots into the ends of the sealing strip; and
   - an attachment strip means for attaching the ends of the sealing strip by insertion into the cut slots in said ends of said sealing strip.

8. The kit of claim 7, wherein each of the channel means is sized to securely engage and substantially immobilize the sealing strip in at least one plane of movement.

9. The kit of claim 1, wherein the channel means is sized to securely engage and substantially immobilize the sealing strip in at least one plane of movement.

* * * * *